US008720915B2

(12) United States Patent
Diaz

(10) Patent No.: US 8,720,915 B2
(45) Date of Patent: May 13, 2014

(54) DEVICE FOR TRANSPORTING A USER WITH AN INJURED LEG

(75) Inventor: Fidias Diaz, Cleveland, OH (US)

(73) Assignee: Invacare Corporation, Elyria, OH (US)

( * ) Notice: Subject to any disclaimer, the term of this patent is extended or adjusted under 35 U.S.C. 154(b) by 324 days.

(21) Appl. No.: 13/202,774

(22) PCT Filed: Feb. 25, 2010

(86) PCT No.: PCT/US2010/025328
§ 371 (c)(1), (2), (4) Date: Aug. 23, 2011

(87) PCT Pub. No.: WO2010/099270
PCT Pub. Date: Sep. 2, 2010

(65) Prior Publication Data

US 2011/0298190 A1 Dec. 8, 2011

Related U.S. Application Data

(60) Provisional application No. 61/155,197, filed on Feb. 25, 2009.

(51) Int. Cl.
*B62B 7/00* (2006.01)

(52) U.S. Cl.
USPC ................................ 280/87.041; 280/87.021

(58) Field of Classification Search
USPC .................. 280/87.021, 87.05, 47.35, 47.11, 280/87.043, 30, 304.1, 657, 638, 400, 418, 280/426, 491.1, 33.996, 1.202, 1.203, 79.2, 280/79.5, 35, 47.19, 47.24, 47.26, 47.34, 280/47.4
See application file for complete search history.

(56) References Cited

U.S. PATENT DOCUMENTS

| | | | |
|---|---|---|---|
| 5,158,313 | A | 10/1992 | Becker |
| 5,800,317 | A | 9/1998 | Accetta |
| 5,839,740 | A | 11/1998 | Seeger |

(Continued)

FOREIGN PATENT DOCUMENTS

| | | |
|---|---|---|
| JP | 2003-199801 | 7/2003 |
| WO | 2010/099270 | 9/2010 |

OTHER PUBLICATIONS

Office action from Canadian Application No. 2,753,663 dated Jan. 28, 2013.
International Search Report and Written Opinion from PCT/US10/25328 dated Apr. 20, 2010.

*Primary Examiner* — John Walters
*Assistant Examiner* — James Triggs
(74) *Attorney, Agent, or Firm* — Calfee, Halter & Griswold LLP

(57) ABSTRACT

The present application is directed to a device for transporting users having an injured leg across a surface and a method of adjusting the device. An embodiment of the device includes a frame, at least two wheel assemblies, and a support for supporting the knee of the injured leg of the user. The frame may have a top portion and at least two legs. The wheel assemblies may be operatively connected to the legs of the frame. The support may be at least partially supported by the top portion of the frame. The device may include an anti-rotation arrangement that increases the resistance to the rotation of a wheel of at least one of the wheel assemblies to assist alignment of the device with a forward direction when a force is applied by the non-injured leg of the user in a direction that is parallel to the forward direction.

29 Claims, 10 Drawing Sheets

(56) References Cited

U.S. PATENT DOCUMENTS

| | | | | |
|---|---|---|---|---|
| 6,123,089 | A | 9/2000 | Fish | |
| 7,287,767 | B1 * | 10/2007 | Gomes et al. | 280/87.021 |
| 7,988,163 | B2 | 8/2011 | Accetta | |
| 2004/0217565 | A1 | 11/2004 | Ramm | |
| 2008/0276977 | A1 | 11/2008 | Jowett et al. | |
| 2008/0284125 | A1 | 11/2008 | Ramm et al. | |
| 2008/0314426 | A1 | 12/2008 | Estrada, Jr. | |

* cited by examiner

DEVICE FOR TRANSPORTING A USER WITH AN INJURED LEG

CROSS REFERENCE TO RELATED APPLICATION

This case is the U.S. national phase entry of PCT/US10/25328 with an international filing date of Feb. 25, 2010, which claims priority to, and any other benefit of, U.S. Provisional Patent Application Ser. No. 61/155,197, filed on Feb. 25, 2009 and entitled APPARATUS FOR TRANSPORTING A USER WITH AN INJURED LEG, which is hereby incorporated by reference in its entirety.

FIELD OF THE INVENTION

The invention of the present application relates to a device for transporting a user with an injured leg and a method of adjusting the device. More specifically, one exemplary embodiment of the invention described in the present application relates to a transportation device that is configured to enhance the ability of the device to track or stay aligned with a desired path.

BACKGROUND

Transportation devices for users with an injured leg are known in the art. One such device is commonly referred to as a knee walker. A knee walker provides mobility to a user having an injured leg without the use of a walking aid, such as a crutch. A knee walker will generally have wheels attached to a frame. The user rests the knee of his or her injured leg on a pad supported by the frame and uses his or her non-injured leg to propel the device across a surface. A knee walker may include casters that provide added maneuverability to the user. A knee walker may have fixed front wheels that only allow the device to travel in a straight line. A knee walker may have a handlebar with steerable front wheels.

SUMMARY

The present application is directed to a transportation device for transporting users having an injured leg across a surface and a method of adjusting the device. An exemplary embodiment of the device includes: a frame, at least two wheel assemblies, and a support for supporting the knee of the injured leg of the user. The frame may have a top portion and at least two legs. The wheel assemblies may be operatively connected to the legs of the frame. The support of the device may be at least partially supported by the top portion of the frame. The device may include an anti-rotation arrangement that increases the resistance to the rotation of a wheel of at least one of the first and second wheel assemblies to assist alignment of the device with a forward direction when a force is applied by the non-injured leg of the user in a direction that is parallel to the forward direction.

DESCRIPTION OF EMBODIMENTS

Figure 1A:
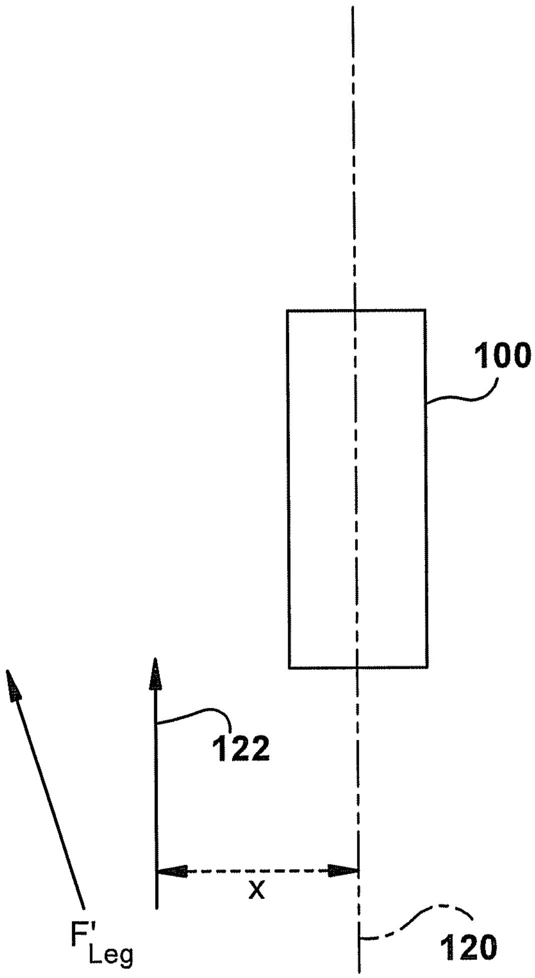
FIGS. 1A and 1B are schematic illustrations of a conventional transportation device.

In various embodiments of the transportation device of the present application, wheel assemblies, such as swivel caster assemblies, are operatively connected to leg portions of a frame of the device and are configured to rotate about the axes of the leg portions. These wheel assemblies permit the device to have a minimal or no turning radius and provide the user with unlimited or unrestricted maneuverability (e.g., the user's mobility is not restricted to travel in a straight line or by a large turning radius). However, swivel caster assemblies attached to a conventional transportation device may, in some circumstances, require some additional effort by the user to move the device along the desired path of travel.

The ability of a transportation device to track or stay aligned with the desired path of travel in the forward direction may be enhanced by increasing the resistance to the rotation of a wheel on one side of the device, but not the rotation of a wheel on the other side of the device. This may be achieved in a wide variety of ways. For example, the resistance to rotation may be increased by increasing the friction between the wheel and the surface, e.g., distributing the force applied by the knee of the injured leg of the user such that a majority of the force is applied on one side of the device. Further, the resistance to rotation may be increased by increasing the friction between the wheel and the hub, or by any other means.

Applicant has found that applying an anti-rotation arrangement to a transportation device that increases the resistance to the rotation of a wheel can enhance the ability of a transportation device to track or stay aligned with the desired path of travel in the forward direction. The anti-rotation arrangement can take a wide variety of different forms. Examples of acceptable anti-rotation arrangements may include, but are not limited to: asymmetrical wheel arrangements, either in the horizontal plane, the vertical plane, or both; differential friction engaging/applying arrangements, such as a clutch in one or more of the wheels; different sizes and shapes of wheels or different types of tires; an angled frame or knee support of the device; or a knee support offset from a central axis of the device. In one exemplary embodiment, the anti-rotation arrangement employs an asymmetrical wheel arrangement with an angled top portion of the frame. This can be achieved in a wide variety of different ways. For example, the device may have a frame with legs of different lengths, with legs of the same length and different sized wheels or wheel assemblies, or with legs of the same length and wheels of the same diameter with one or more washers between one of the legs and its wheel assembly.

The Applicant has discovered that angling the frame portion of a transportation device having swivel caster wheels enhances the ability of the device to track or stay aligned with a desired path of travel and reduces the force required to keep the device on the desired path of travel. The angle between the frame portion of the device and the horizontal is referred to herein as the banking angle (see, for example, banking angle Ø in FIG. 3A). The angled frame portion of the device acts as an anti-rotation arrangement by increasing the resistance to the rotation of one or more wheels of the device. The banking angle applied to the frame portion may vary based on at least one or more of the weight and body dimensions of the user, the force applied by the non-injured leg of the user, or the dimensions of the device.

The banking angle may be determined in a wide variety of ways. In one embodiment illustrated by FIGS. 1A-5, the banking angle can be determined based on a series of equations developed by the Applicant. However, the banking angle may be determined by other means. For example, the banking angle may be determined by trial and error or experimentation, or may be based on the size of an average user. In some embodiments, the banking angle may be selected to improve the ability of the device to track or stay aligned with a desired path of travel, but may not completely prohibit the device from curving. Any manner in which angling a frame portion of the device enhances the ability of the device to track or stay aligned with a desired path of travel or reduces the force required to keep the device on a desired path of travel may be used to determine the banking angle.

Figure 1B:
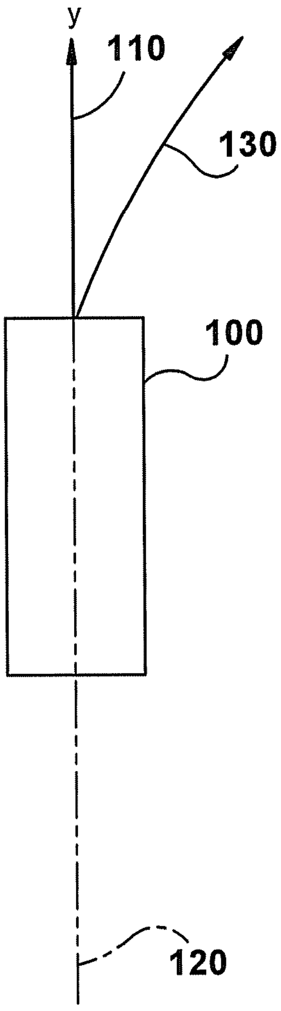

FIG. 1A is a schematic representation of a conventional transportation device 100 having a central axis 120 with wheels (not shown) disposed on opposite sides of the central axis. As illustrated, a force $F_{Leg}$ applied by the non-injured leg of a user to propel device 100 is offset from central axis 120 by a distance x. If this force $F_{Leg}$ were applied by the user in the direction indicated by arrow 122 (i.e., in a direction parallel to the central axis 120), the offset force $F_{Leg}$ could result in a clockwise angular acceleration that causes device 100 to "track" or "trail away" from a desired path of travel 110 and curve somewhat to the right. As illustrated in FIG. 1B, the desired path of travel 110 is in a forward direction and the resulting path of travel 130 curves to the right.

The user of a conventional transportation device 100 can apply a force $F'_{Leg}$ (shown in FIG. 1A) that is not parallel to central axis 120 to keep the device on the desired path of travel 110 and prevent the curving from occurring. As is apparent, if the forces $F'_{Leg}$ and $F_{Leg}$ have the same magnitude, the component of force $F'_{Leg}$ in the direction of the desired path of travel 110 is less than the force $F_{Leg}$, potentially resulting in some additional effort by the user to move along the desired path of travel.

Figure 2A:
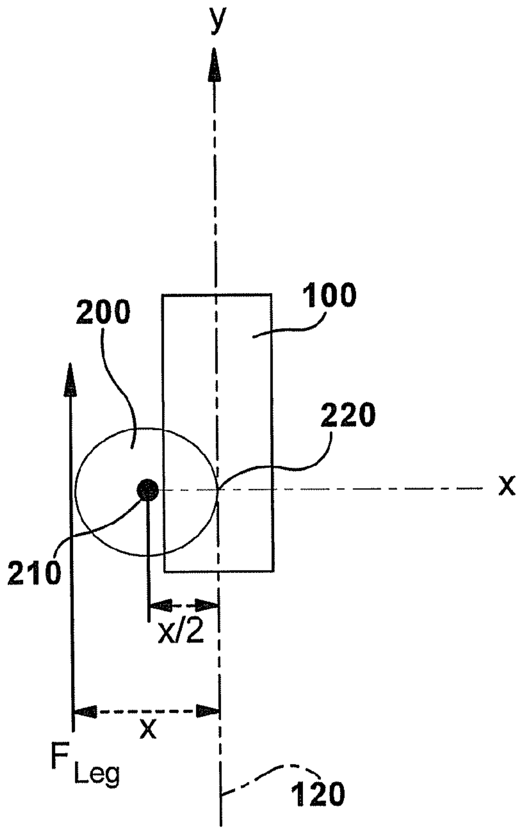
FIGS. 2A and 2B are a free body diagram and kinematics diagram, respectively, of the conventional transportation device of FIGS. 1A and 1B with a user.
Figure 2B:
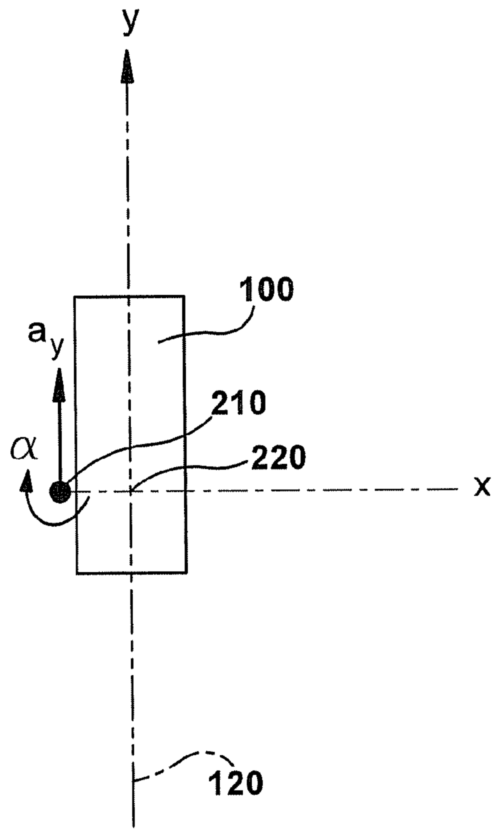

A free body diagram and kinematics diagram of conventional transportation device 100 with a user 200 are illustrated in FIGS. 2A and 2B, respectively. FIG. 2A illustrates a hypothetical force $F_{Leg}$ applied by the non-injured leg of user 200 to propel device 100 that is parallel to and offset from central axis 120 by distance x. Further, a hypothetical center of mass 210 of user 200 is half the distance x from the central axis 120, or x/2. Thus, user 200 is assumed to be of distance x wide with his or her center of mass 210 at the center of his or her body. As illustrated in FIG. 2B, device 100 and user 200 have an acceleration in the y-direction $a_y$ and an angular acceleration α. Thus, the moment of inertia $I_o=\frac{1}{2}mgx^2+mg(x/2)^2=\frac{3}{4}mgx^2$, where m=mass of user 200 and g=gravitational acceleration. Summing the moments about the origin 220 results in the following equation:

$$\Sigma M_o=I_o\alpha$$

$$F_{Leg}x=(\tfrac{3}{4}mgx^2)\alpha$$

$$\alpha=(4F_{Leg})/(3mgx)$$

If the hypothetical force $F_{Leg}$ were applied in the direction indicated by arrow $F_{Leg}$, the device 100 could move somewhat away from desired travel path 110 (shown in FIG. 1B) due to the clockwise angular acceleration α.

Figure 3A:
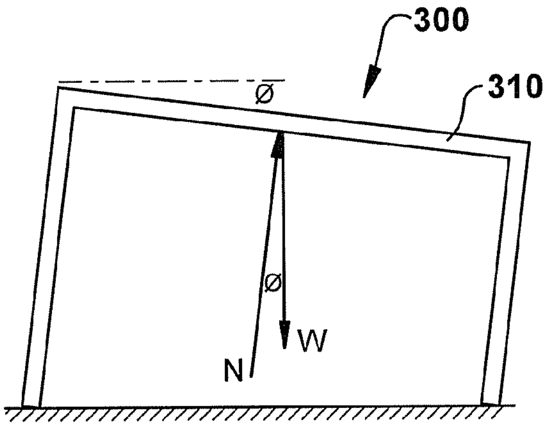
FIGS. 3A and 3B are a free body diagram and a kinematics diagram, respectively, of an exemplary frame of a transportation device according to an embodiment of the present application.
Figure 3B:
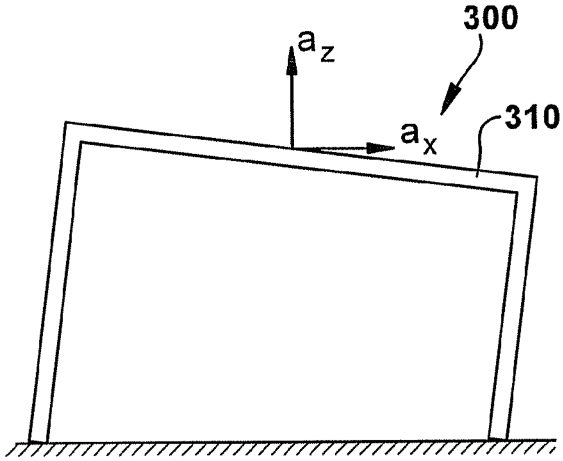
Figure 8:
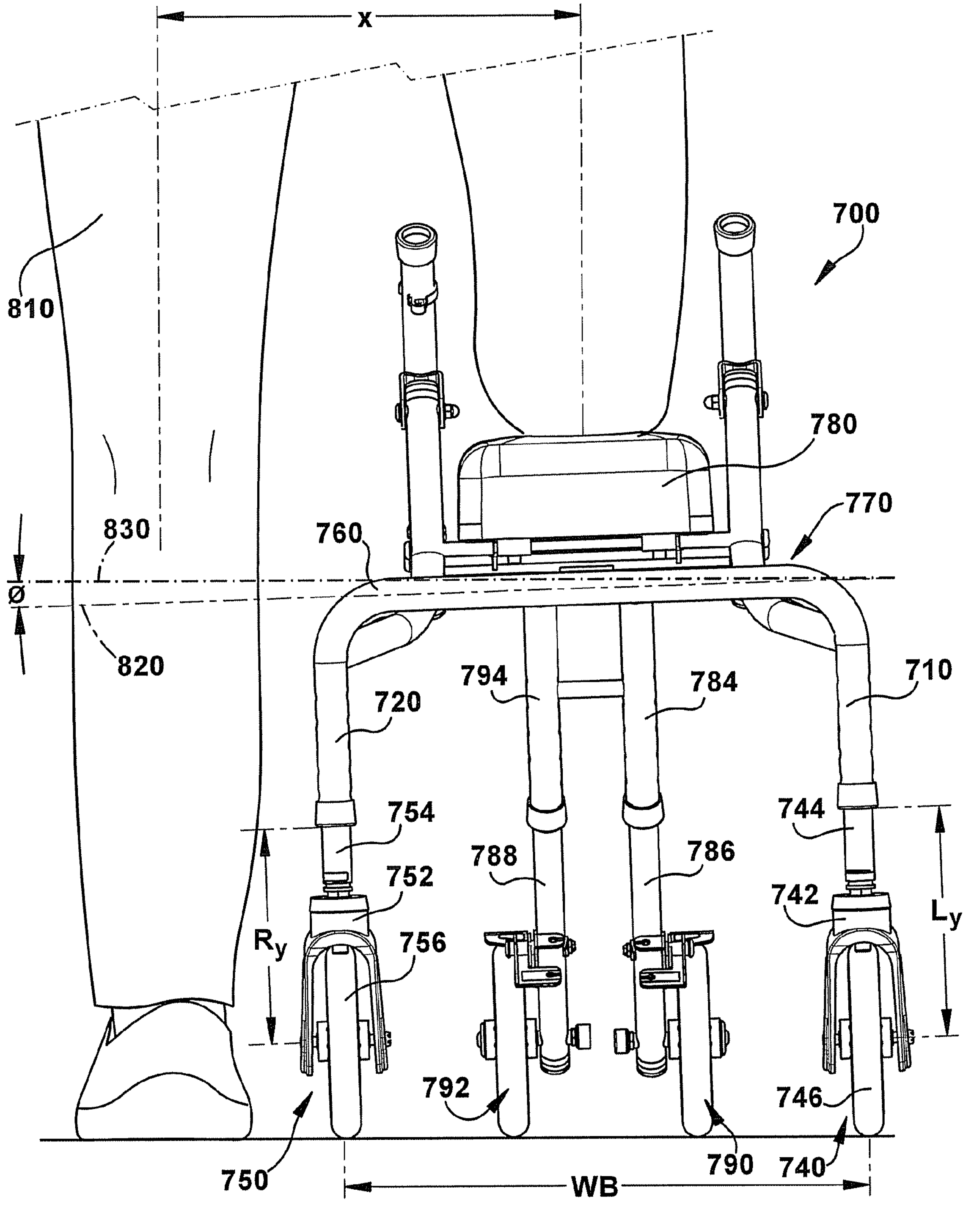
FIG. 8 is a front view of the transportation device of FIG. 7A, wherein the handle is removed and a user having an injured left leg is shown using the device.

Applicant has discovered that setting at least a portion of the frame of a transportation device with a banking angle Ø (e.g., as shown in FIG. 3A or FIG. 8) causes the device to travel along the desired path of travel 110 when force $F_{Leg}$ is applied in a direction parallel to the path of travel or reduces the component of force $F'_{Leg}$ in a direction that is not in alignment with the path of travel. FIG. 3A is a free body diagram and FIG. 3B is a kinematics diagram which illustrate the front view of an exemplary frame 300 of a transportation device according to an embodiment of the present application. As illustrated, the exemplary frame portion 300 includes a top portion 310 having a banking angle Ø relative to the horizontal surface. N is the reaction force of the ground and W=m g, where m=mass and g=gravitational acceleration. The following equations result from summing the forces in the z-direction and in the x-direction:

$$\Sigma F_z=ma_z \quad \Sigma F_x=ma_x$$

$$N\cos Ø-mg=0 \quad N\sin Ø=ma_x$$

$$N=(mg)/\cos Ø \quad N=(ma_x)/\sin Ø$$

Combining these equations and solving for the acceleration in the x-direction $a_x$, the resultant equation becomes $a_x=g\tan Ø$. To determine a banking angle Ø or range of banking angles that cause the device to travel along the desired path of travel 110 when force $F_{Leg}$ is applied in a direction parallel to the path of travel or reduce the component of force $F'_{Leg}$ in a direction that is not in alignment with the path of travel, a counteracting angular momentum may be calculated.

Figure 4A:
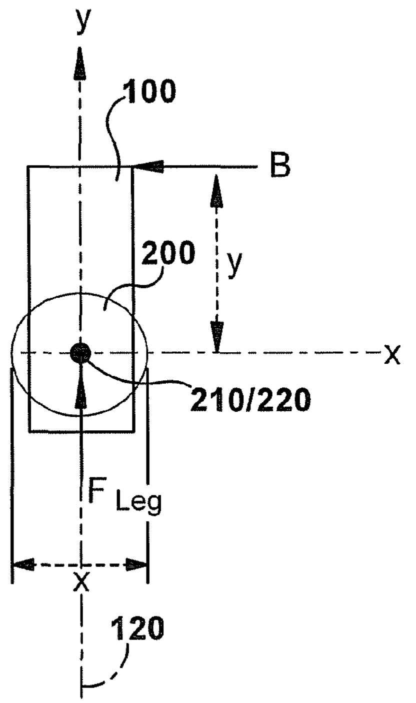
FIGS. 4A and 4B are a free body diagram and kinematics diagram, respectively, of the conventional transportation device of FIGS. 1A and 1B with a user and banking force.
Figure 4B:
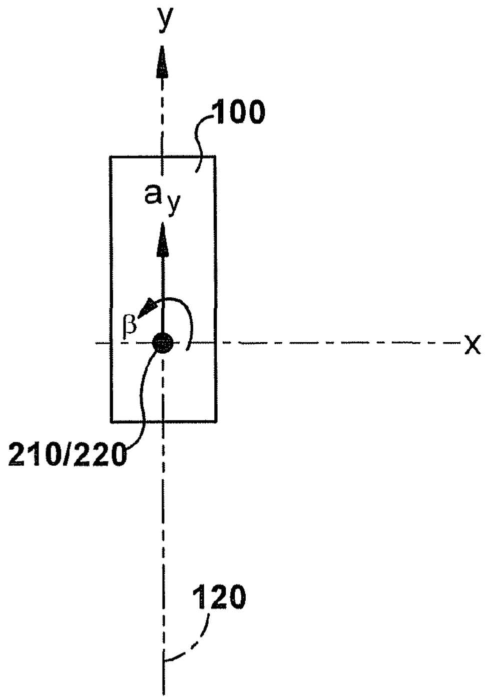

To determine the equal but opposite angular momentum required to cause the device to travel along the desired path of travel 110 when force $F_{Leg}$ is applied in a direction parallel to the path of travel or reduce the component of force $F'_{Leg}$ in a direction that is not in alignment with the path of travel, a banking force B is applied to the front of device 100. A free body diagram and kinematics diagram of device 100 with user 200 and banking force B are illustrated in FIGS. 4A and 4B, respectively. As illustrated, banking force B is applied to the front of device 100 at a distance y from the origin 220. Further, center of mass 210 of user 200 and force $F_{Leg}$ applied by the non-injured leg of the user are located at the origin 220 to isolate the effect of banking force B. As illustrated, the banking force $B=ma_x$ and β is the angular acceleration. Summing the moments about the origin 220, where the moment of inertia $I_o=\frac{1}{2}mx^2$, results in the following equation:

$$\Sigma M_o = I_o\beta$$

$$By = (\tfrac{1}{2}mx^2)\beta$$

$$(ma_x)y = (\tfrac{1}{2}mx^2)\beta$$

β represents the counter clockwise angular acceleration of device 100 with banking force B applied to the front of the device. Substituting g tan Ø for $a_x$ and solving for β results in the equation $\beta = 2(g \tan Ø y)/x^2$.

An angular momentum of equal magnitude, but in the opposite direction, is required to cause the device to travel along the desired path of travel 110 when force $F_{Leg}$ is applied in a direction parallel to the path of travel or reduce the component of force $F'_{Leg}$ in a direction that is not in alignment with the path of travel. Thus, counter clockwise angular acceleration β can be equated to clockwise angular acceleration α. Substituting α=β and solving for banking angle Ø results in the Applicant's banking angle equation: $Ø = \tan[(2 F_{Leg}\, x)/(3\, m\, g\, y)]^{-1}$, where $F_{Leg}$=force applied by the non-injured leg of the user at a distance x from the central axis of the device; x=distance of the non-injured leg from the central axis of the device; m=mass of the user; g=gravitational acceleration; and y=distance along central axis between the knee of the injured leg of the user and the angled portion of the frame of the device. Thus, setting the frame of a transportation device with a banking angle Ø pursuant to the banking angle equation reduces the force required to keep the device from tracking or trailing away from the desired path of travel.

Figure 5:
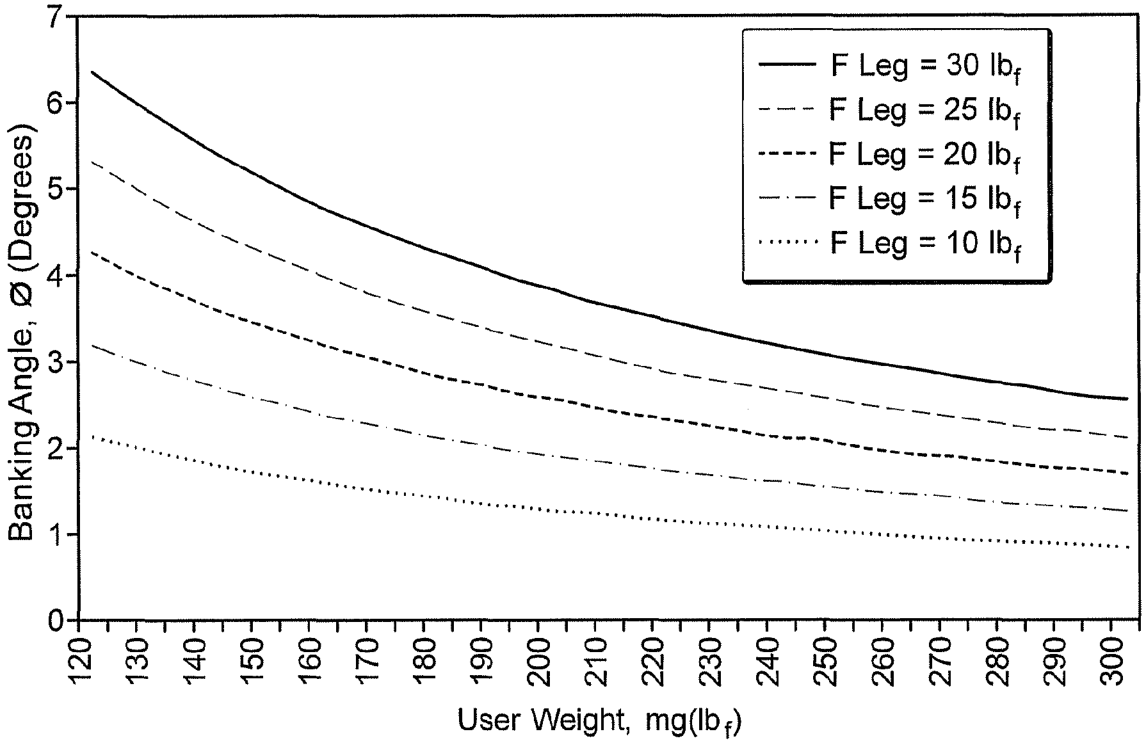
FIG. 5 is an exemplary graph plotting a banking angle Ø pursuant to a banking angle equation.

FIG. 5 is an exemplary graph plotting the banking angle Ø pursuant to the Applicant's banking angle equation described above. As shown, the banking angle Ø (degrees) is plotted as a function of the user's weight (W=mg, $lb_f$) for five different forces $F_{Leg}$ ($lb_f$) applied by the non-injured leg of the user (i.e., 30, 25, 20, 15, and 10 $lb_f$). The graph of FIG. 5 assumes a length of 1.5 feet for distance y along the central axis of the device between the knee of the injured leg of the user and the angled portion of the frame. However, other distances may be used depending on the configuration or dimensions of the device. For example, FIGS. 7B and 7D show distance y pursuant to an exemplary embodiment of a device 700 of the present application. Further, the graph of FIG. 5 assumes a range of 1 to 1.5 feet for distance x of the non-injured leg from the central axis of the device. Again, distance x may vary depending on the weight or body dimensions of the user of the device, and/or the embodiment or dimensions of the device.

As shown in the graph of FIG. 5, the banking angle Ø may range from about 0.5 to 7.0 degrees depending on the weight of the user and force applied by the non-injured leg. The Applicant believes that, for an average user, a banking angle Ø between about 2.0 and 3.0 degrees, 2.25 and 2.75 degrees, 2.4 and 2.6 degrees, or about 2.5 degrees is needed to reduce the force required to keep a device from tracking or trailing away from the desired path of travel.

Figure 6:
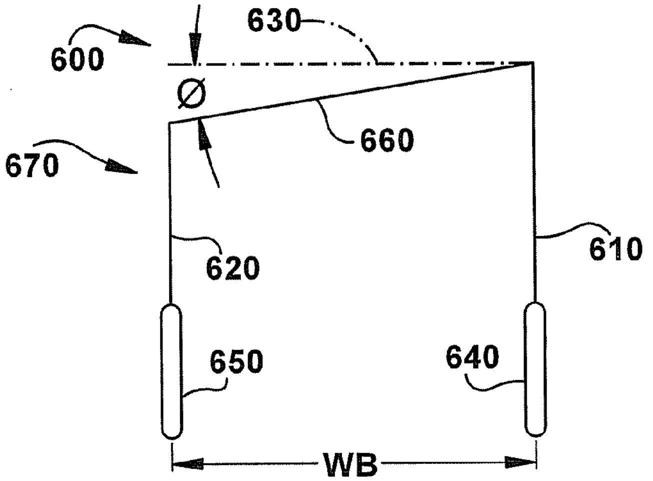
FIG. 6 is a schematic depicting the front view of a frame of a transportation device according to an embodiment of the present application.

FIG. 6 schematically depicts the front view of a frame 670 of a transportation device 600 for transporting users having an injured leg across a surface according to an embodiment of the present application. As shown, frame 670 includes a top portion 660 and two leg portions 610, 620. Two wheel assemblies 640, 650 of device 600 are operatively connected to leg portions 610, 620. First or right wheel assembly 650 is operatively connected to first or right leg portion 620 of frame 670. Second or left wheel assembly 640 is operatively connected to second or left leg portion 610 of frame 670. As shown, wheel assemblies 640, 650 are the front wheels of device 600. Wheel assemblies 640, 650 may be configured to rotate about the axes of leg portions 610, 620 and include a stem portion that operatively connects the wheel assembly to the leg portion. Further, wheel assemblies 640, 650 may be adjustably connected to leg portions 610, 620.

Referring to FIG. 6, top portion 660 is angled relative to horizontal 630. The angle between top portion 660 and horizontal 630 is the banking angle Ø and may be defined by the Applicant's banking angle equation described above. Banking angle Ø reduces the force required to keep device 600 from tracking in a direction away from the user. As shown, top portion 660 of frame 670 slopes from left to right and is configured for use by users with an injured left leg. Thus, banking angle Ø reduces the force required to keep device 600 from tracking left. However, device 600 may be configured for use by users having an injured right leg. In these embodiments, top portion 660 of frame 670 slopes from right to left, reversing the banking angle Ø and reducing the force required to keep device 600 from tracking right.

Referring to FIG. 6, banking angle Ø between top portion 660 of frame 670 and horizontal 630 may be adjustable or fixed. Banking angle Ø may be between about 0.1 to 15.0 degrees, 0.5 to 7.0 degrees, 1.0 to 6.0 degrees, 1.5 to 5.0 degrees, 2.0 to 4.0 degrees, 2.0 to 3.0 degrees, 2.25 to 2.75 degrees, 2.4 to 2.6 degrees, or about 2.5 degrees. Banking angle Ø may vary based on one or more of the following factors: the weight of the user (e.g., about 100 to 300 $lb_f$); the force applied by the non-injured leg of the user (e.g., about 5 to 35 $lb_f$); the distance along a central axis (not shown in FIG. 6) of the device between the knee of the injured leg of the user and top portion 660 of frame 670 (e.g., about 6 to 36 inches); and/or the distance between the central axis of the device and the non-injured leg of the user (e.g., about 6 to 36 inches).

Banking angle Ø may be set or adjusted using a variety of methods. For example, one of wheel assemblies 640, 650 may be taller than the other wheel assembly, forcing corresponding leg portion 610, 620 of frame 670 upward and angling top portion 660 relative to horizontal 630. For example, referring to FIG. 6, the height of left wheel assembly 640 (e.g., the distance from the end of left leg portion 610 to the center of the wheel) would be greater than the height of right wheel assembly 650 (e.g., the distance from the end of right leg portion 620 to the center of the wheel) such that top portion 660 of frame 670 is angled relative to horizontal 630. Alternatively, for users with an injured right leg, the height of right wheel assembly 650 would be greater than the height of left wheel assembly 640.

The height differential between wheel assemblies 640, 650 may be achieved in a variety of ways. For example, each wheel assembly may include at least one stem portion that operatively connects the wheel assembly to the corresponding leg portion. The stem portion of the first wheel assembly may be longer than the stem portion of the second wheel assembly such that the top portion of the frame is angled relative to the horizontal. Further, the distance between a connection point of the stem portion of the first wheel assembly to the first leg and the center of the wheel may be greater than the distance between a connection point of the second stem portion of the second wheel assembly to the second leg and the center of the wheel such that the top portion of the frame is angled relative to the horizontal. Further still, the wheel of one wheel assembly may have a larger diameter than the wheel of the other wheel assembly, forcing the corresponding leg portion of the frame upward and angling the top portion relative to the horizontal.

The height differential between the wheel assemblies may be about 0.25 to 0.75 inches, 0.3 to 0.7 inches, 0.35 to 0.65 inches, 0.4 to 0.6 inches, about 0.5 inches, or about 0.53 inches. The height differential Δ between the wheel assemblies may be determined for a desired banking angle using the equation: height differential Δ=(WB)(tan Ø), where WB is the horizontal distance between the first wheel assembly and the second wheel assembly and Ø is the desired banking angle.

Wheel assemblies 640, 650 may also be adjustably connected to leg portions 610, 620. Thus, banking angle Ø may be set or adjusted by adjusting one of wheel assemblies 640, 650 relative to corresponding leg portion 610, 620. For example, referring to FIG. 6, left wheel assembly 640 would be adjusted relative to left leg portion 610 such that the distance from the end of the left leg portion to the center of the wheel of the left wheel assembly is greater than the distance from the end of right leg portion 620 to the center of the wheel of right wheel assembly 650. Alternatively, for users with an injured right leg, right wheel assembly 650 would be adjusted relative to right leg portion 620 such that the distance from the end of the right leg portion to the center of the wheel of the right wheel assembly is greater than the distance from the end of left leg portion 610 to the center of the wheel of left wheel assembly 640.

Wheel assemblies 640, 650 may be set or adjusted relative to leg portions 610, 620 in a variety of ways. For example, at least one wheel assembly may include at least one stem portion that adjustably connects the wheel assembly to the leg portion. A connection point between the stem portion and the leg portion may be adjusted to increase or decrease the distance between the leg portion and the center of the wheel, thus adjusting the banking angle between the top portion of the frame and the horizontal. Any suitable connection for adjustably connecting a wheel assembly to a frame may be used including for example, an infinite adjustment mechanism having a friction or threaded connection, a biased detent, rod, or pin aligned with one of a plurality of openings, or the like. The connection may also be adjusted based on one or more factors, such as the weight or body dimensions of the user or the dimensions of the device.

Referring to FIG. 6, wheel assemblies 640, 650 of device 600 may be interchangeable such that the device can accommodate users with injured right or left legs. For example, as discussed above, one of wheel assemblies 640, 650 may be taller than the other wheel assembly. The taller wheel assembly may be attached to right leg portion 620 for users with an injured right leg or left leg portion 610 for users with an injured left leg. The taller wheel assembly may be at least partially color coded to distinguish it from the shorter wheel assembly.

Referring to FIG. 6, device 600 may include a support for supporting the knee of the injured leg of the user. The support may be directly or indirectly connected to frame 670. The support may be adjustable relative to frame 670 and may form an angle with top portion 660 of the frame. Device 600 may also include a third wheel assembly operatively connected to a third leg of frame 670. The third wheel assembly may be a rear wheel of the device and may be adjustable relative the third leg. The third wheel assembly may be configured to rotate about the axis of the third leg portion or may be fixed relative to the third leg.

Figure 7A:
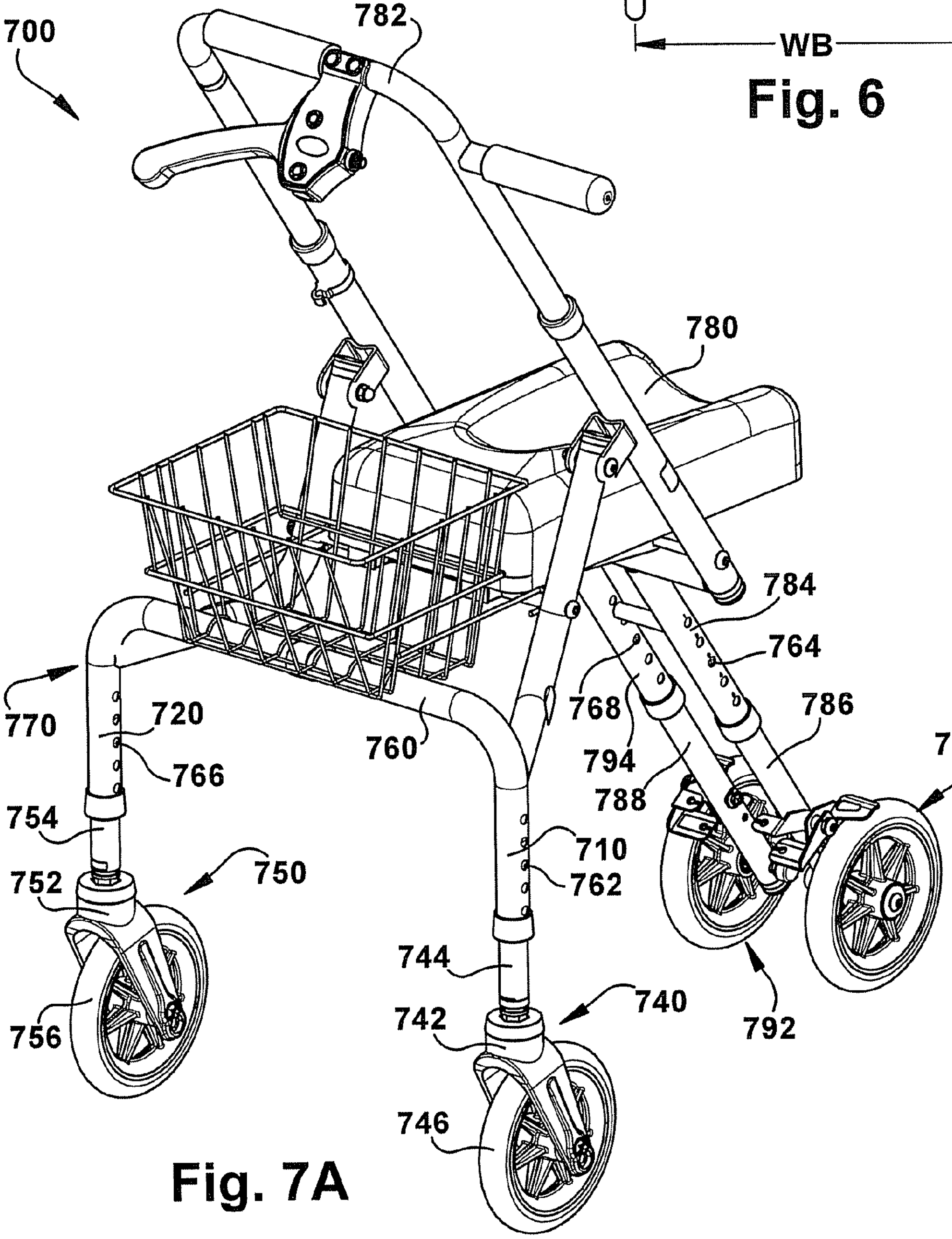
FIG. 7A is a perspective view of a transportation device according to an embodiment of the present application.
Figure 7B:
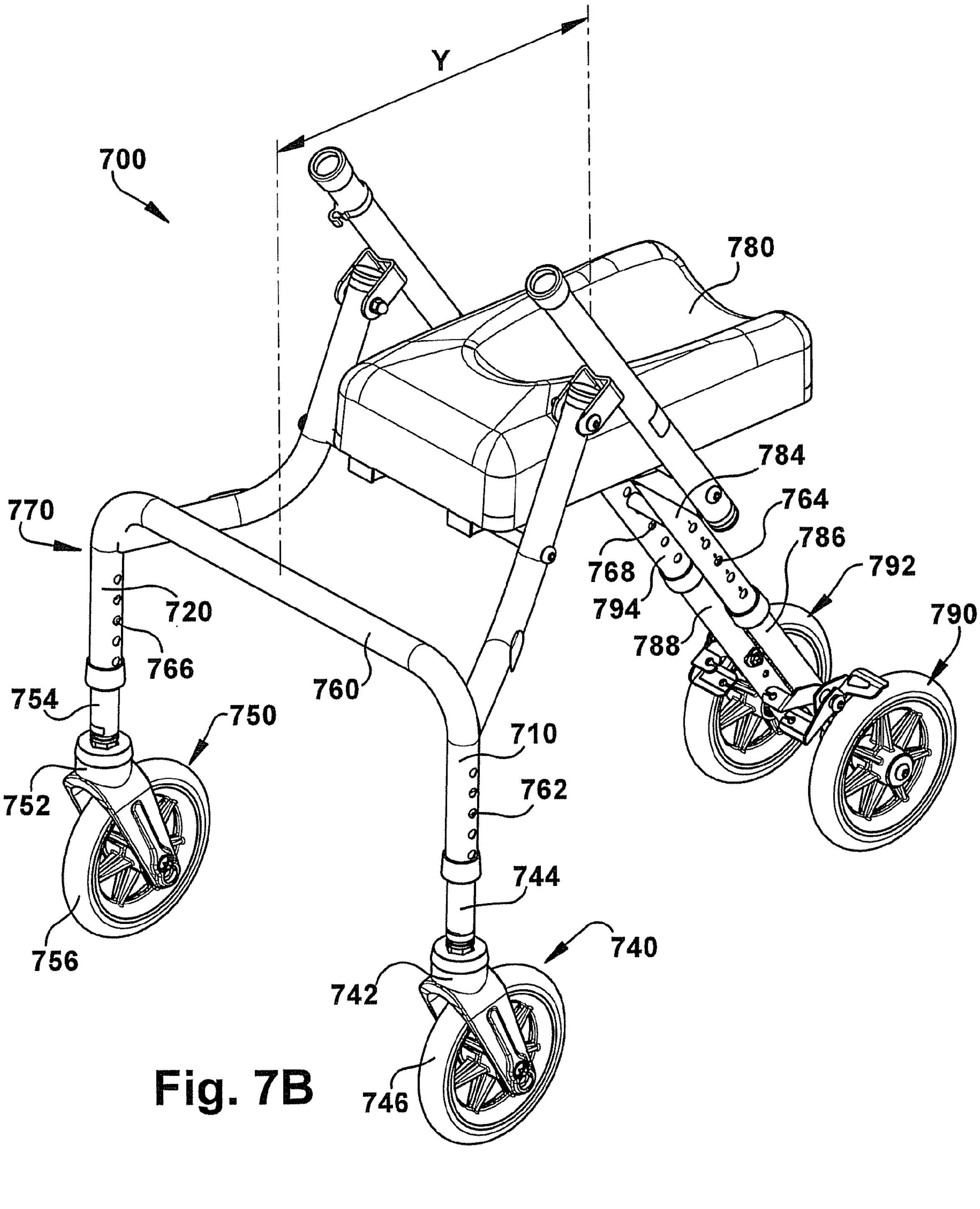
FIG. 7B is a perspective view of the transportation device of FIG. 7A, wherein a handle and a basket of the device is removed.

FIGS. 7A-8 show various views of a transportation device 700 for transporting users having an injured leg across a surface according to an embodiment of the present application. As shown, device 700 includes a frame 770 having a front top portion 760, two front leg portions 710, 720, and two rear leg portions 784, 794. Two front wheel assemblies 740, 750 of device 700 are operatively connected to corresponding front leg portions 710, 720 and are configured such that at least a portion of the wheel assembly rotates about the axis of the front leg portion. Two rear wheel assemblies 790, 792 are operatively connected to corresponding rear leg portions 784, 794 and are configured such that the rear wheels are fixed in one direction. Device 700 includes a support 780 connected to frame 770 and configured to support the knee of the injured leg of the user. Device 700 also includes a handle adjustably connected to frame 770.

As shown in FIGS. 7A-9, each front wheel assembly 740, 750 includes a wheel 746, 756, a swivel portion 742, 752, and a stem portion 744, 754. Each swivel portion 742, 752 is operatively connected to the corresponding stem portion 744, 754 and configured to rotate about the axis of the stem portion. Each wheel 746, 756 is operatively connected to the corresponding swivel portion 742, 752.

As shown in FIGS. 7A-9, each stem portion 744, 754 of a front wheel assembly 740, 750 is adjustably connected to a corresponding front leg portion 710, 720. Each stem portion 744, 754 is also configured to be received within the corresponding front leg portion 710, 720 and is coaxially aligned with the front leg portion. Further, each stem portion 744, 754 includes a biased detent 762, 766 configured to align with one of a plurality of openings in the corresponding front leg portion 710, 720. Thus, each opening in front leg portion 710, 720 provides a connection point between the front leg portion and the corresponding stem portion 744, 754 so that the stem portion may be adjusted relative to the front leg portion. As shown, each stem portion 744, 754 is connected to the corresponding front leg portion 710, 720 at the third connection point from the end of the front leg portion.

As shown in FIGS. 7A-8, each rear wheel assembly 790, 792 includes a stem portion 786, 788 adjustably connected to a corresponding rear leg portion 784, 794. Each stem portion 786, 788 is configured to be received within the corresponding rear leg portion 784, 794 and is coaxially aligned with the rear leg portion. Each stem portion 786, 788 also includes a biased detent 764, 768 configured to align with an opening in the corresponding rear leg portion 784, 794. Each rear leg portion 784, 794 includes a plurality of openings such that each stem portion 786, 788 can be adjusted relative to the corresponding rear leg portion.

As shown in FIG. 8, front top portion 760 of frame 770 is angled relative to horizontal 830. The angle between the longitudinal axis 820 of front top portion 760 and horizontal 830 is the banking angle Ø and may be defined by the Applicant's banking angle equation described herein. Banking angle Ø reduces the force required to keep device 700 from tracking in a direction away from user 810. As shown, front top portion 760 of frame 770 slopes from left to right and is configured for use by users with an injured left leg. Thus, banking angle Ø reduces the force required to keep device 700 from tracking left. However, device 700 may be configured for use by users having an injured right leg. In these embodiments, front top portion 760 of frame 770 slopes from right to left, reversing the banking angle Ø and reducing the force required to keep device 700 from tracking right.

Referring to FIGS. 7A-8, banking angle Ø between longitudinal axis 820 of front top portion 760 and horizontal 830 may vary based on one or more of the following factors: the weight of user 810 (e.g., about 100 to 300 $lb_f$); the force applied by the non-injured leg of user 810 (e.g., about 5 to 35 $lb_f$); the distance y (shown in FIGS. 7B, 7D, and 7E) along a central axis 798 of device 700 between the knee of the injured leg of user 810 and longitudinal axis 820 of front top portion 760 of frame 770 (e.g., about 6 to 36 inches); and/or the distance x (shown in FIG. 8) between central axis 798 of device 700 and the non-injured leg of user 810 (e.g., about 6 to 36 inches).

Figure 7C:
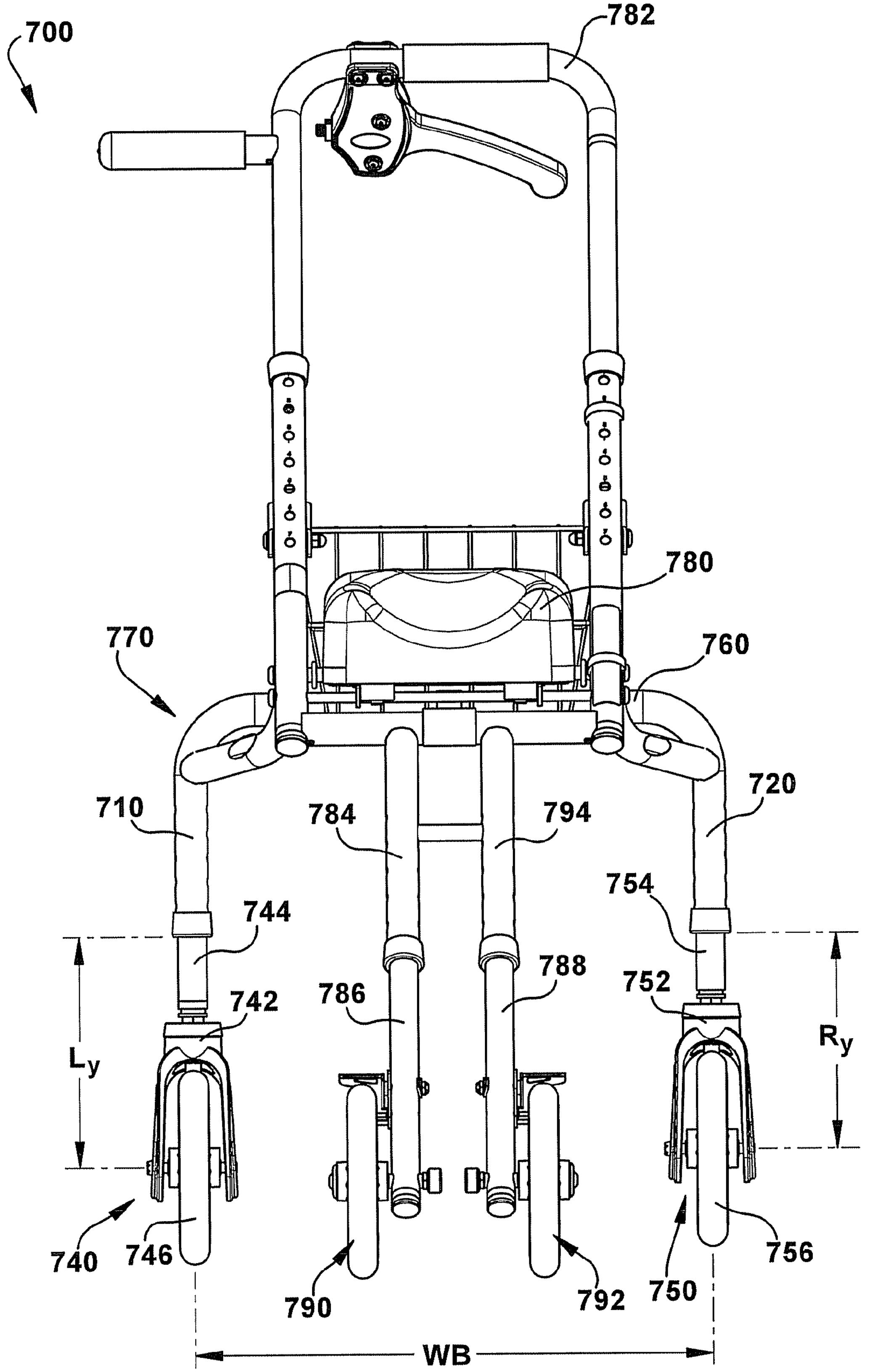
FIG. 7C is a rear view of the transportation device of FIG. 7A.
Figure 7D:
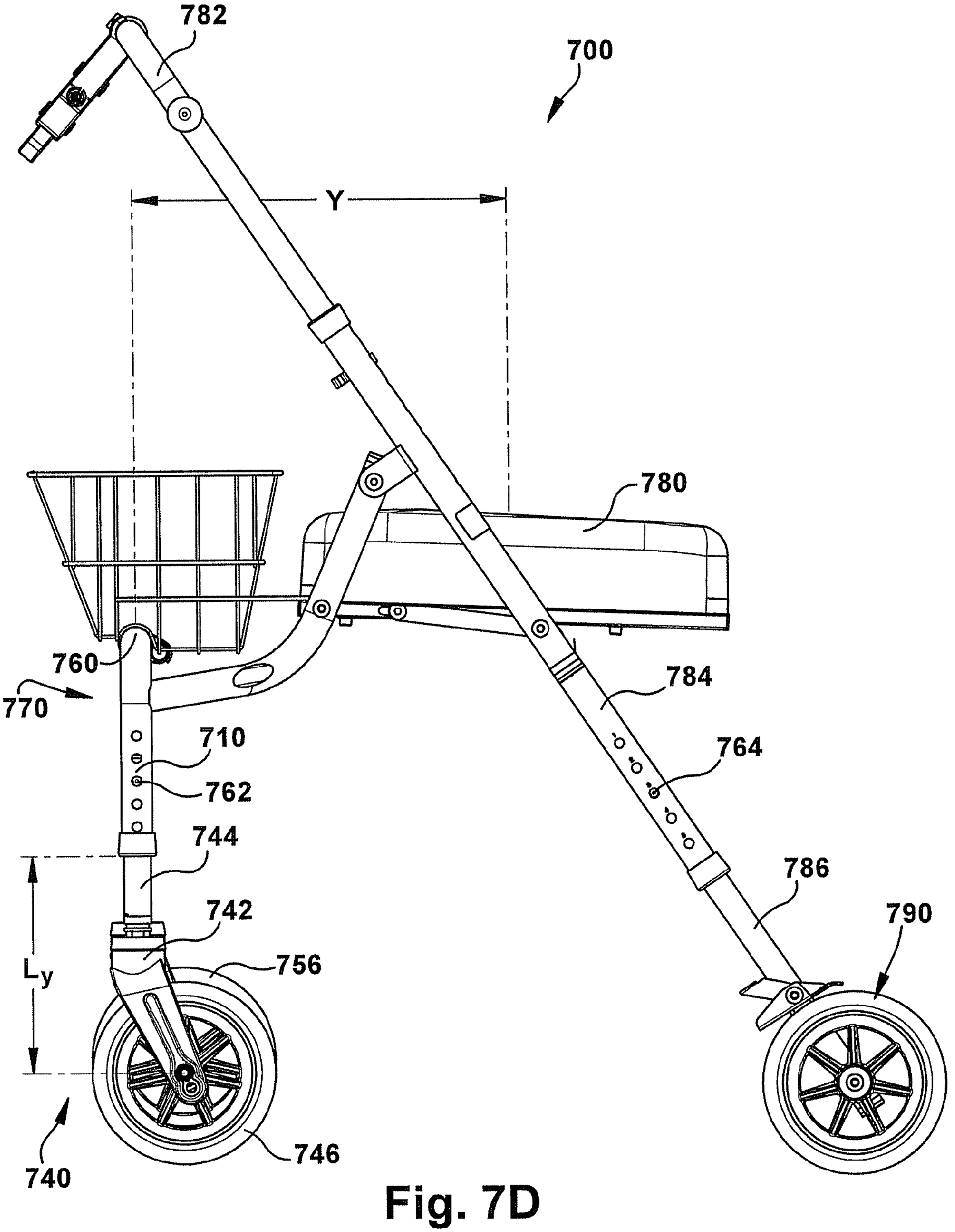
FIG. 7D is a left side view of the transportation device of FIG. 7A.
Figure 7E:
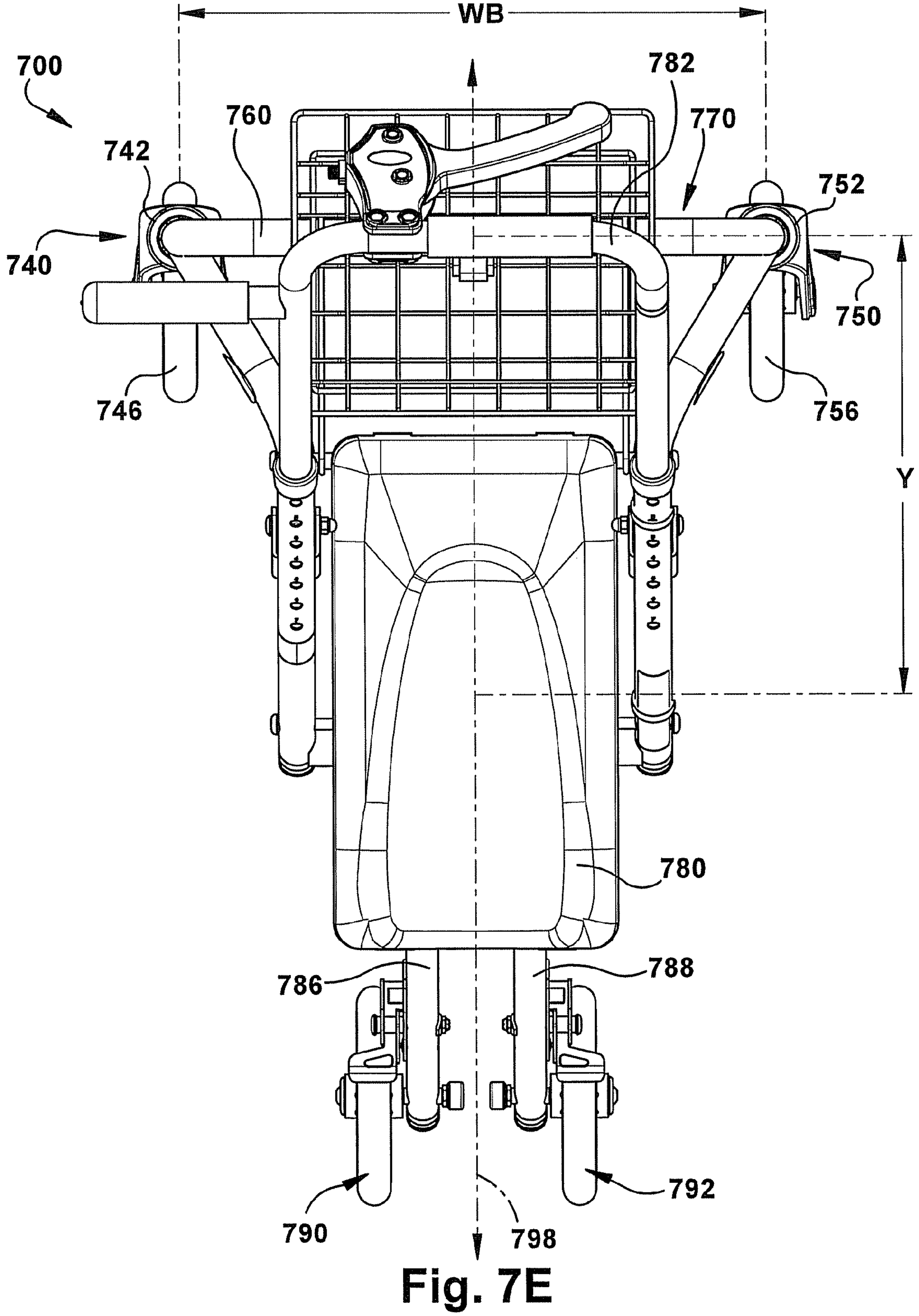
FIG. 7E is a top view of the transportation device of FIG. 7A.
Figure 9:
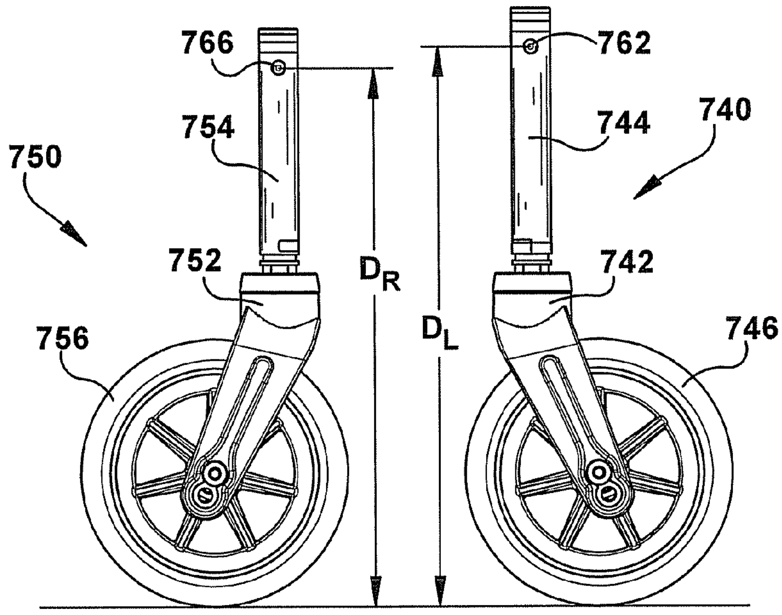
FIG. 9 is a front view of two wheel assemblies of the transportation device of FIG. 7A, wherein the wheel assemblies are removed from the device.

As shown in FIG. 9, stem portion 744 of front wheel assembly 740 is longer than stem portion 754 of front wheel assembly 750. Further, the distance $D_L$ between biased detent 762 of stem portion 744 and the surface is greater than the distance $D_R$ between biased detent 766 of stem portion 754 and the surface. As shown in FIGS. 7C, 7D, and 8, when each stem portion 744, 754 is connected to corresponding front leg portion 710, 720 at the same connection point relative to the end of the front leg portion (shown as connection point 3), stem portion 744 forces front leg portion 710 upward and angles front top portion 760 relative to horizontal 830. Thus, the distance $L_y$ from the end of front leg portion 710 to the center of wheel 746 is greater than the distance $R_y$ from the end of front leg portion 720 to the center of wheel 756 such that front top portion 760 of frame 770 is angled relative to horizontal 830. The height differential (e.g., $L_y-R_y$, $D_L-D_R$) between front wheel assemblies 740, 750 may be determined for a desired banking angle using the equation: height differential $\Delta=(WB)(\tan Ø)$, where WB is the horizontal distance between front wheel assembly 740 and front wheel assembly 750 and Ø is the desired banking angle.

As shown in FIG. 8, because front wheel assembly 740 has a longer stem portion 744 than front wheel assembly 750 and is attached to front leg portion 710 on the left side of device 700, front top portion 760 of frame 770 slopes from left to right and device 700 is configured for use by users with an injured left leg. Alternatively, for users with an injured right leg, wheel assembly 740 can be switched with wheel assembly 750 such that wheel assembly 740 is attached to front leg portion 720 on the right side of device 700. In this embodiment, front top portion 760 of frame 770 slopes from right to left and device 700 is configured for use by users with an injured right leg. Thus, front wheel assembly 740 is interchangeable with front wheel assembly 750 such that device 700 can accommodate users with injured right or left legs. At least one wheel assembly 740, 750 may also be color coded to distinguish it from the other wheel assembly.

As shown in FIGS. 7A-8, each stem portion 744, 754 of a front wheel assembly 740, 750 is adjustably connected to a corresponding front leg portion 710, 720. Thus, banking angle Ø can be adjusted by adjusting at least one of front wheel assemblies 740, 750 relative to the corresponding front leg portion 710, 720. For example, the connection point between stem portion 744 and front leg portion 710 may be adjusted to increase or decrease the distance $L_y$ between the end of the front leg portion and the center of wheel 746, thus adjusting banking angle Ø between front top portion 760 of frame 770 and horizontal 830. As shown, stem portion 744 is connected to front leg portion 710 at the third connection point from the end of the front leg portion. Thus, by depressing biased detent 762 and adjusting stem portion 744 downward such that it is connected to front leg portion 710 at the second connection point from the end of the front leg portion increases distance $L_y$ and increases banking angle Ø. The connection may be adjusted based on one or more factors, such as the weight or body dimensions of the user or the dimensions of the device.

Further, as shown in FIGS. 7A-8, each stem portion 786, 788 of a rear wheel assembly 790, 792 is adjustably connected to a corresponding rear leg portion 784, 794. Thus, if needed, at least one of rear wheel assembly 790, 792 may be adjusted relative to the corresponding rear leg portion 784, 794 to compensate for banking angle Ø and ensure stability of device 700. For example, stem portion 786 of rear wheel assembly 790 may be adjusted slightly downward relative to rear leg portion 784 to compensate for the height differential between front wheel assembly 740 and front wheel assembly 750 and ensure that device 700 remains stable during use.

As discussed above, the Applicant has discovered that angling the frame portion of a transportation device having swivel caster wheels enhances the ability of the device to track or stay aligned with a desired path of travel and reduces the effort required to keep the device on the desired path of travel. As shown in FIGS. 6-9 and described above, one exemplary embodiment of the present application comprises an anti-rotation arrangement that employs an asymmetrical wheel arrangement with an angled top portion of the frame. The angled top portion of the frame permits the force applied by the knee of the injured leg of the user to be distributed such that a majority of the force is applied on one side of the device. Thus, the resistance to the rotation of a wheel on the side of the device that the majority of the force is applied is increased due to the increased friction between the wheel and the surface.

For example, as shown in FIG. 6, top portion 660 of frame 670 slopes from left to right and is configured for use by users with an injured left leg. The angled top portion 660 of frame 670 permits the force applied by the knee of the injured leg of the user to be distributed such that a majority of the force is applied to the wheel of wheel assembly 650, increasing the friction between the wheel and the surface. As configured, the force required to keep the device from tracking left is reduced due to the increased resistance to the rotation of the wheel of wheel assembly 650, enhancing the ability of the device to track or stay aligned with the desired path of travel in the forward direction.

Figure 10:
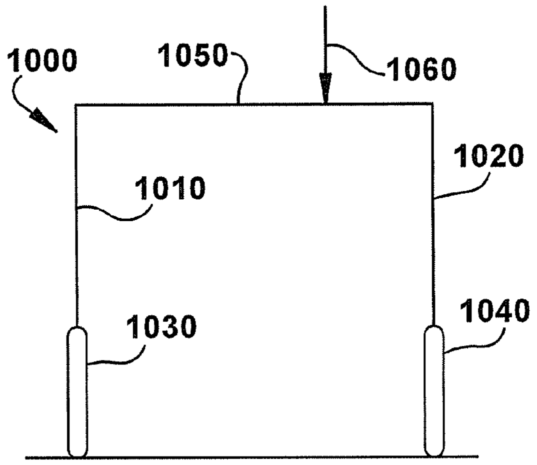
FIGS. 10-12 are schematics depicting the front view of a frame of a transportation device employing various anti-rotation arrangements according to embodiments of the present application.

The anti-rotation arrangement can take a wide variety of different forms. For example, FIG. 10 schematically depicts the front portion of a frame of a transportation device 1000 having an anti-rotation arrangement that permits the force 1060 applied by the knee of the injured leg of the user to be distributed such that a majority of the force is applied on one side of the device. The frame of the device includes a top portion 1050, a first leg 1010, and a second leg 1020. First wheel assembly 1030 is operatively connected to first leg 1010 and second wheel assembly 1040 is operatively connected to second leg 1020. As shown, the force 1060 applied by the knee of the injured leg of the user is distributed such that a majority of the force is applied to the wheel of second wheel assembly 1040. This may be accomplished in a variety of ways, e.g., by configuring the device such that the knee support is offset from a central axis of the device.

Figure 11:
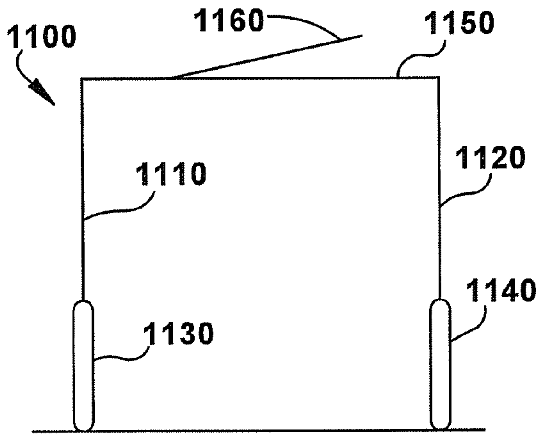

Further, FIG. 11 schematically depicts the front portion of a frame of a transportation device 1100 having an anti-rotation arrangement employed as an angled knee support 1160 that permits a force applied by the knee of the injured leg of the user to be distributed such that a majority of the force is applied on one side of the device. The frame of the device includes a top portion 1150, a first leg 1110, and a second leg 1120. First wheel assembly 1130 is operatively connected to first leg 1110 and second wheel assembly 1140 is operatively connected to second leg 1120. As shown, knee support 1160 is angled relative top portion 1150. Thus, a force applied by the knee of the injured leg of the user is distributed such that a majority of the force is applied to the wheel of first wheel assembly 1130.

Figure 12:
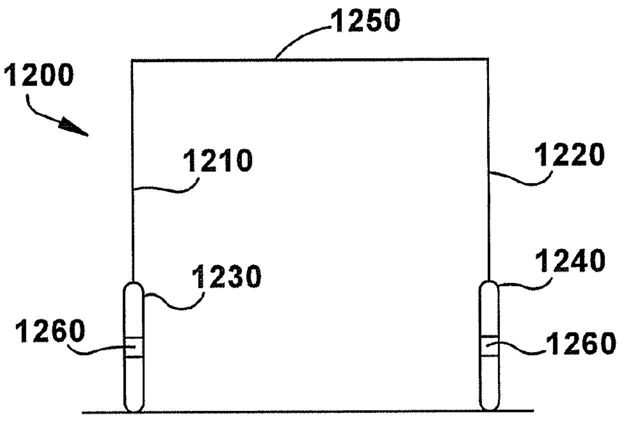

FIG. 12 schematically depicts the front portion of a frame of a transportation device 1200 having an anti-rotation arrangement employed as a differential friction engaging/applying arrangement 1260 (e.g., a clutch) that increases the friction between the wheel and the hub of one or more wheel assemblies of the device. Thus, the resistance to the rotation of a wheel having differential friction engaging/applying arrangement 1260 is increased due to the increased friction between the wheel and the hub. The frame of the device includes a top portion 1250, a first leg 1210, and a second leg 1220. First wheel assembly 1230 is operatively connected to first leg 1210 and second wheel assembly 1240 is operatively connected to second leg 1220. As shown, each wheel of each wheel assembly 1230, 1240 includes a differential friction engaging/applying arrangement 1260. Thus, the resistance to rotation of the wheel can be increased for either of the wheels of wheel assemblies 1230, 1240.

While the present invention has been illustrated by the description of embodiments thereof, and while the embodiments have been described in considerable detail, it is not the intention of the applicants to restrict or in any way limit the scope of the invention to such details. Additional advantages and modifications will readily appear to those skilled in the art. For example, where components are releasably or removably connected or attached together, any type of releasable connection may be suitable including for example, locking connections, fastened connections, tongue and groove connections, etc. Further, where components are adjustably connected together, any type of adjustable connection may be suitable including for example, an infinite adjustment mechanism having a friction or threaded connection, a biased detent, rod, or pin aligned with one of a plurality of openings, or the like. Still further, component geometries, shapes, and dimensions can be modified without changing the overall role or function of the components. Therefore, the inventive concept, in its broader aspects, is not limited to the specific details, the representative apparatus, and illustrative examples shown and described. Accordingly, departures may be made from such details without departing from the spirit or scope of the applicant's general inventive concept.

I claim:

1. A transportation device for transporting users having an injured leg across a surface, comprising:

a frame having a central axis, a top portion, and at least two legs;

a first wheel assembly operatively connected to a first leg of the frame;

a second wheel assembly operatively connected to a second leg of the frame; and a support for supporting the knee of the injured leg of the user, the support connected to the frame;

wherein the device includes an anti-rotation arrangement that increases the resistance to the rotation of a wheel of at least one of the first and second wheel assemblies about the wheel's axis of rotation to assist alignment of the device with a forward direction when a force is applied by the non-injured leg of the user in a direction that is parallel to the forward direction; and wherein the anti-rotation arrangement comprises the top portion of the frame angled relative to the surface, and wherein the top portion of the frame slopes from at least one of right to left for users with an injured right leg and left to right for users with an injured left leg.

2. The transportation device of claim 1, wherein the angle between the top portion of the frame and the surface is the banking angle Ø defined by the equation: Ø=tan [(2 FLeg x)/(3 m g y)]−1, where FLeg=force applied by the non-injured leg of the user at a distance x from the central axis of the device; x=distance of the non-injured leg from the central axis of the device; m=mass of the user; g=gravitational acceleration; and y=distance along the central axis between the knee of the injured leg of the user and the top portion of the frame.

3. The transportation device of claim 1, wherein the angle between the top portion of the frame and the surface is about 0.5 degrees to 7.0 degrees.

4. The transportation device of claim 1, wherein the angle between the top portion of the frame and the surface is about 1.5 degrees to 5.0 degrees.

5. The transportation device of claim 1, wherein the angle between the top portion of the frame and the surface is about 2.5 degrees.

6. The transportation device of claim 1, wherein the angle between the top portion of the frame and the surface is adjustable.

7. The transportation device of claim 1, wherein the angle between the top portion of the frame and the surface varies based on at least one of the weight of the user, the force applied by the non-injured leg of the user, the distance of the non-injured leg from the central axis of the device, and the distance along the central axis between the knee of the injured leg of the user and the top portion of the frame.

8. The transportation device of claim 1, wherein the first wheel assembly and the second wheel assembly comprise swivel caster wheels.

9. A transportation device for transporting users having an injured leg across a surface, comprising:

a frame having a central axis, a top portion, and at least two legs;

a first wheel assembly operatively connected to a first leg of the frame;

a second wheel assembly operatively connected to a second leg of the frame; and a support for supporting the knee of the injured leg of the user, the support connected to the frame;

wherein the device includes an anti-rotation arrangement that increases the resistance to the rotation of a wheel of at least one of the first and second wheel assemblies about the wheel's axis of rotation to assist alignment of the device with a forward direction when a force is applied by the non-injured leg of the user in a direction that is parallel to the forward direction, and wherein the anti-rotation arrangement comprises the top portion of the frame angled relative to the surface; and wherein the first wheel assembly and the second wheel assembly comprise swivel caster wheels; and wherein the height of the first wheel assembly from the end of the first leg to the center of the wheel is greater than the height of the second wheel assembly from the end of the second leg to the center of the wheel such that the top portion of the frame is angled relative to the surface.

10. The transportation device of claim 9, wherein the height differential between the first wheel assembly and the second wheel assembly is about 0.25 inches to 0.75 inches.

11. The transportation device of claim 9, wherein the height differential between the first wheel assembly and the second wheel assembly is about 0.5 inches or about 0.53 inches.

12. The transportation device of claim 9, wherein the height differential between the first wheel assembly and the second wheel assembly is defined by the equation: height differential=(Wheel Base) (tan Ø), where, Wheel Base is the horizontal distance between the first wheel assembly and the second wheel assembly and Ø is the angle between the top portion of the frame and the surface.

13. The transportation device of claim 9, wherein the first leg of the frame is on the right side of the frame such that the taller first wheel assembly is attached to a right leg of the device for user's with an injured right leg.

14. The transportation device of claim 9, wherein the first leg of the frame is on the left side of the frame such that the taller first wheel assembly is attached to a left leg of the device for user's with an injured right leg.

15. The transportation device of claim 9, wherein the taller first wheel assembly is at least partially color coded to distinguish it from the shorter second wheel assembly.

16. The transportation device of claim 1, wherein the wheel assemblies of the device are interchangeable such that the device may accommodate users with injured right or left legs.

17. The transportation device of claim 1, wherein the first wheel assembly and the second wheel assembly each comprise at least one stem portion that operatively connects the wheel assembly to the leg of the frame.

18. The transportation device of claim 17, wherein the stem portion of the first wheel assembly is longer than the stem portion of the second wheel assembly such that the top portion of the frame is angled relative to the surface.

19. The transportation device of claim 17, wherein the distance between a connection point of the stem portion of the first wheel assembly to the first leg and the surface is greater than the distance between a connection point of the stem portion of the second wheel assembly to the second leg and the surface such that the top portion of the frame is angled relative to the surface.

20. The transportation device of claim 17, wherein the connection between at least one stem portion of the wheel assemblies and at least one leg of the frame is adjustable such that the angle between the top portion of the frame and the surface may be adjusted.

21. The transportation device of claim 20, wherein the connection is adjusted at least partially based on the weight of the user.

22. The transportation device of claim 1, wherein the diameter of the wheel of the first wheel assembly is greater than the diameter of the wheel of the second wheel assembly such that the top portion of the frame is angled relative to the surface.

23. The transportation device of claim 1, wherein the support is adjustable relative to the frame and may form an angle with at least a portion of the frame.

24. The transportation device of claim 1 further comprising a third wheel assembly attached to a third leg of the frame, wherein the first and second wheel assemblies are front wheels and the third wheel assembly is a rear wheel.

25. A method of adjusting a transportation device for transporting users having an injured leg across a surface, comprising the steps of:

providing a device having: a frame with a central axis, a top portion, and at least two legs; a first wheel assembly operatively connected to a first leg of the frame; a second wheel assembly operatively connected to a second leg of the frame; and a support connected to the frame for supporting the knee of the injured leg of the user; and applying an anti-rotation arrangement to the device that increases the resistance to the rotation of a wheel of at least one of the first and second wheel assemblies about the wheel's axis of rotation to assist alignment of the device with a forward direction when a force is applied by the non-injured leg of the user in a direction that is parallel to the forward direction, wherein the anti-rotation arrangement is applied to the device by determining an angle between the top portion of the frame and the surface and adjusting one of the wheel assemblies to angle the top portion of the frame relative to the surface.

26. The method of claim 25, wherein the angle between the top portion of the frame and the surface is determined based on at least one of the weight of the user, the force applied by the non-injured leg of the user, the distance of the non-injured leg from the central axis of the device, and the distance along the central axis between the knee of the injured leg of the user and the top portion of the frame.

27. The method of claim 25, wherein the angle between the top portion of the frame and the surface is the banking angle Ø and is determined using the equation: Ø=tan [(2 FLeg x)/(3 m g y)]−1, where FLeg=force applied by the non-injured leg of the user at a distance x from the central axis of the device; x=distance of the non-injured leg from the central axis of the device; m=mass of the user; g=gravitational acceleration; and y=distance along the central axis between the knee of the injured leg of the user and the top portion of the frame.

28. The method of claim 25, wherein the height of the first wheel assembly from the end of the first leg to the center of the wheel is greater than the height of the second wheel assembly from the end of the second leg to the center of the wheel, and wherein the adjusting one of the wheel assemblies comprises attaching the first wheel assembly to the first leg such that the top portion of the frame is angled relative to the surface.

29. The method of claim 28 further comprising determining the height differential between the first wheel assembly and the second wheel assembly using the equation: height differential=(Wheel Base) (tan Ø), where, Wheel Base is the horizontal distance between the first wheel assembly and the second wheel assembly and Ø is the angle between the top portion of the frame and the surface.

* * * * *